Feb. 17, 1953 R. A. SALOMONE ET AL 2,628,997
FEED-IN AND JUNCTION BOX FOR BUS BAR DUCT SYSTEMS
Filed Feb. 10, 1949 3 Sheets-Sheet 1

INVENTORS
Rynold A. Salomone
BY Cecil B. Turton
ATTORNEY

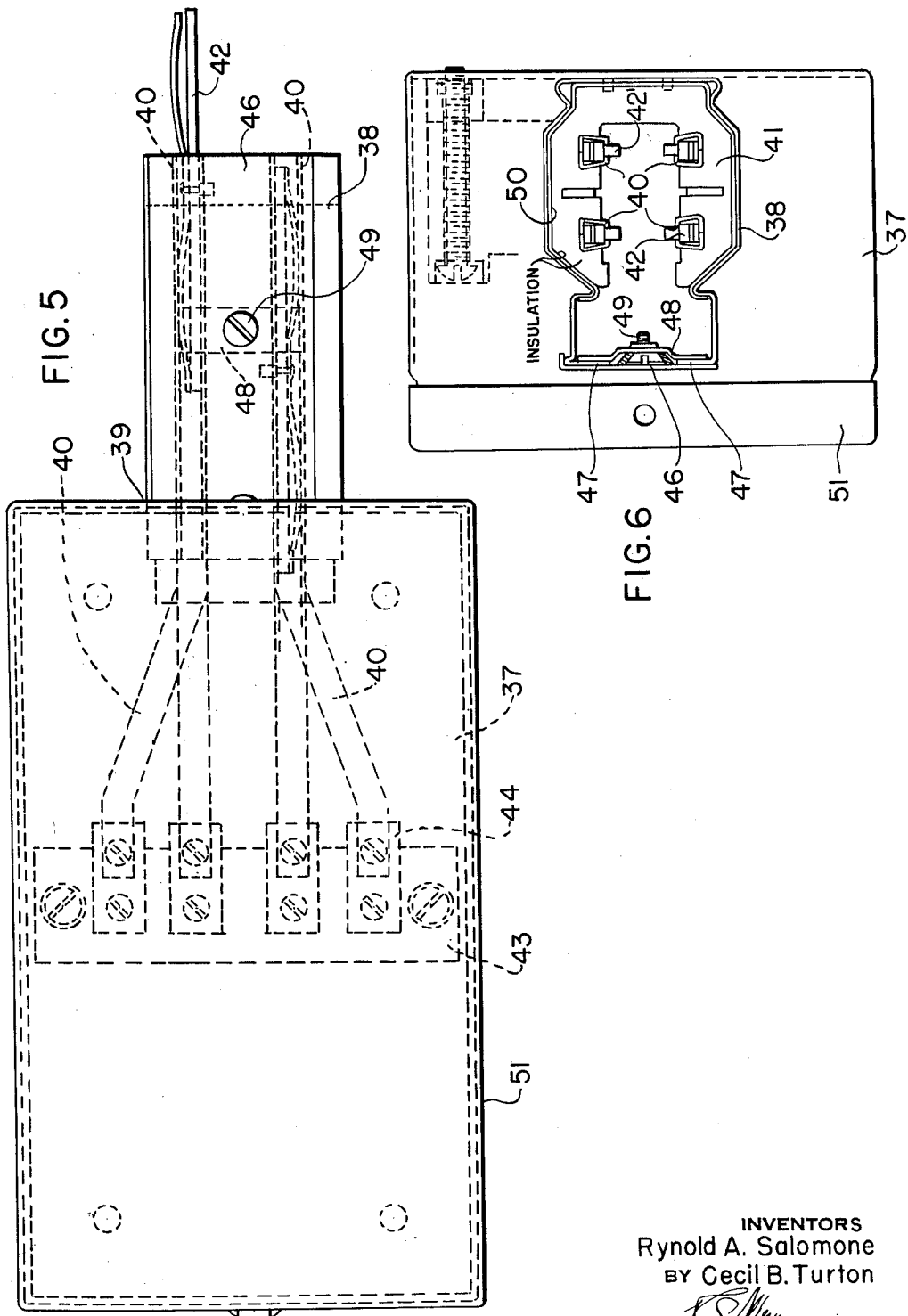

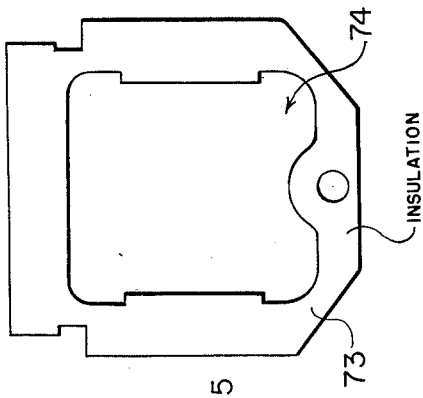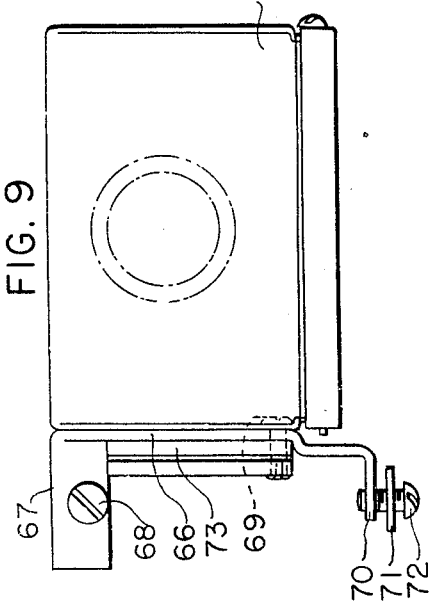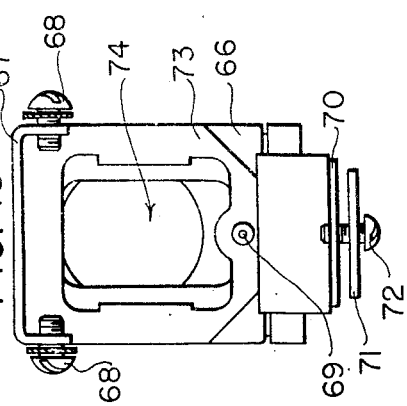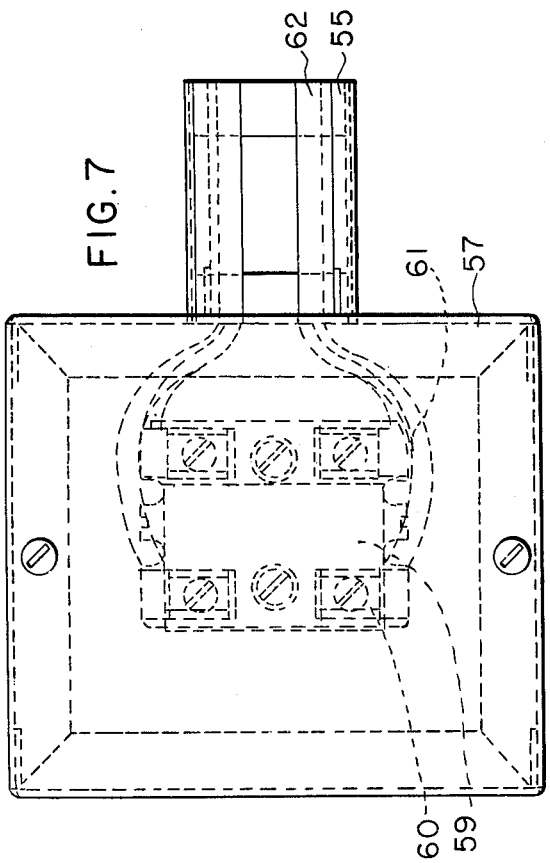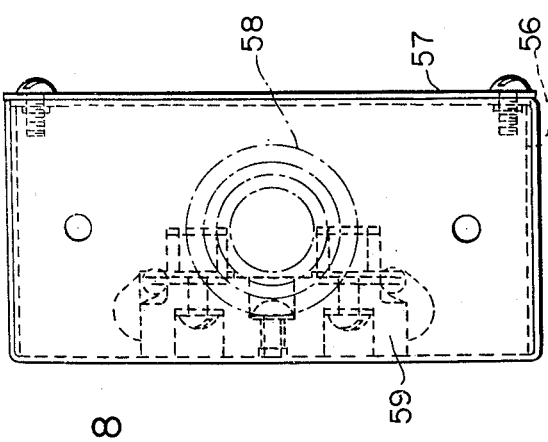

Patented Feb. 17, 1953

2,628,997

UNITED STATES PATENT OFFICE 2,628,997

FEED-IN AND JUNCTION BOX FOR BUS BAR DUCT SYSTEMS

Rynold A. Salomone and Cecil B. Turton, Plainville, Conn., assignors, by mesne assignments, to General Electric Company, a corporation of New York Application February 10, 1949, Serial No. 75,566

3 Claims. (Cl. 174—59)

The invention relates particularly to a system of distribution of electric power as set forth in a copending application of Herman J. Hammerly, filed January 29, 1949, Serial No. 73,570, in which a plurality of bus bars are supported by insulator plates at intervals along the length of a unitary metallic duct which is constructed to receive collectors or branch-take-off devices at various points.

One object is to provide discrete connection boxes that can be readily inserted into, attached to or removed from a duct system of electric distribution.

These boxes are provided with duct sections so that they can constitute insertable and removable parts of the duct system.

Fig. 5 is a face view of an end feed-in junction box.

Fig. 6 is a end view of the form of Fig. 5.

Fig. 7 is a face view of a flush-type feed-in end box for a bus duct system.

Fig. 8 is a rear view of the box of Fig. 7.

Fig. 9 is a side view of an end box showing means for securing it to the end of a duct.

Fig. 10 is an end view of the same.

Fig. 11 is a detail view of an insulating plate for the box of Figs. 9 and 10 on an enlarged scale.

The duct 14 itself is formed preferably of sheet metal closed at the top or back 15 and open at the bottom or front and provided with spaced flanges 16 so that collectors or take-off devices can be inserted.

At the ends and at intervals along the length of the duct U-shaped insulator plates 17 are located and two, three or four bus bars such as 18 are mounted in these insulators in position to receive contacts carried by the inserted plug-in collectors (not shown).

Figure 1:
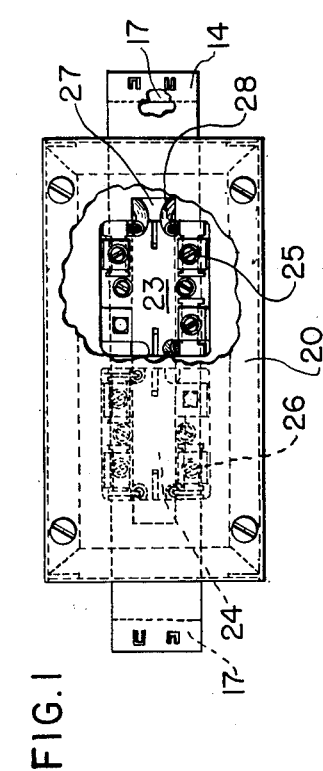
Fig. 1 is a top plan view partially broken away of a sectionalized center feed-in box embodying the invention for a bus bar duct system.
Figure 3:
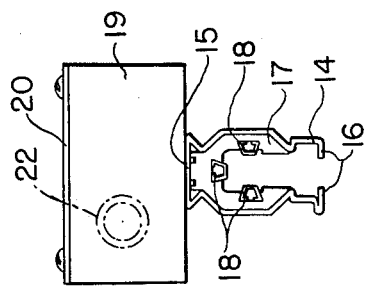
Fig. 3 is an end view of the same.
Figure 2:
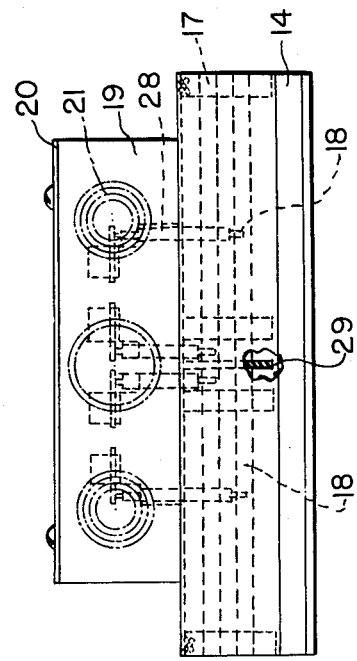
Fig. 2 is a side view of the same.

The unit shown in Figs. 1, 2 and 3 consists of a duct section 14 formed as shown and on which is mounted a box 19 having a detachable cover 20. Suitable provision is made for entrance as by the knockouts 21 and 22.

In the box are mounted two insulating blocks 23 and 24 having terminals such as 25 and 26. The top of the duct is provided with a slot or passageway 27 through which conductors such as 28 extend from the terminals.

The bus bars from the right-hand end of duct 14 are connected to the terminals on block 23 and the bus bars from the left-hand end of the duct are connected to block 24 terminals. An insulator plate 29 may be interposed between the right-hand bus bars and the left-hand bus bars as indicated in Fig. 2.

Such units can be located at suitable places in the system and connected by means of suitable jacks as will be later shown and described with respect to Figs. 5 and 6.

Figure 4:
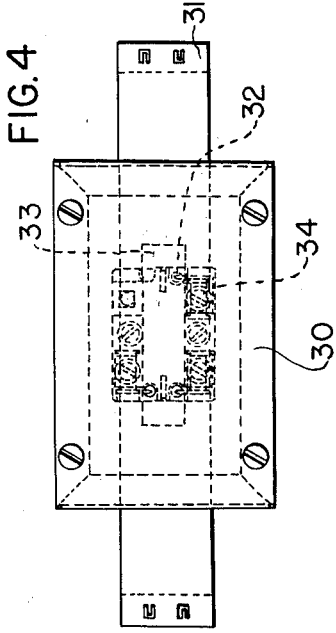
Fig. 4 is a top plan view of another form of center feed-in box.

Fig. 4 shows a box and cover 30 similar to box 19 and mounted on a duct 31 similar to duct 14. In this case, the bus bars extend through the duct and are connected by conductors such as 32 which extend through a slot 33 in the top of the duct and in the bottom of the box to the respective terminals 34.

The unit shown in Figs. 5 and 6 is intended as a junction box 37 at the end of a duct 38 which extends into a wall of the box and is welded or brazed at 39. In this case there are four bus bars 40 supported on insulators 41. These bus bars are tubular and of trapezoidal cross-section to accommodate double-ended jacks 42 which serve to connect the duct section 38 to an adjacent duct section (not shown). These bus bars may be slotted and the jacks provided with projections 42' to facilitate sliding the jacks in or out of the bus bars. Inside of the box is secured a terminal block 43 on which are mounted terminals 44 to which the ends of the bus bars 40 are attached, some being bent to facilitate assembly.

The exposed portions of the duct may be provided with dust caps 46 which overlap the edges of the duct and close the slot between the flanges 47, 47. This cap is secured in place by a crossbar 48 which spans the flanges 47, 47 on the inside and is clamped in place by a screw 49. The duct may be lined with insulating material 50 for added protection. The box 37 preferably has a cover 51.

The form shown in Figs. 7 and 8 is also the flush-type where the duct 55 is brazed or welded to the box 56 which has a cover 57 and one or more knockouts 58. The terminal block 59 is mounted in the box and has terminals 60 which are connected by insulated conductors 61 to the ends of the bus bars 62 in the duct 55.

In Figs. 9 and 10 is shown an end box 65 provided with an attachment for connecting the box to a duct such as herein shown and described. This attachment consists of a plate 66 which has a cross-piece 67 which overlies the top of the duct and has clamp screws 68 for engaging the duct. This plate is secured to the box by a rivet or screw 69 and has an opening for passage of conductors from the bus bars to suitable terminals in the box (not shown). The lower end of plate 66 has a foot 70 adapted to fit inside the flanges of the duct and be clamped to the duct by the cross-piece 71 and screw 72 from the outside. One or more insulating plates 73 is also preferably secured by the rivet 69 at the end of the duct but leaving a passage 74 for the passage of the conductors from the bus bars into the box.

It will be understood that these boxes and duct sections are all adapted to be used with a duct system as above set forth.

It should also be understood that the use of tubular bus bars supported by insulators is preferable and that connection jacks such as shown and claimed in the Hammerly application are most desirable.

We claim:

1. In a bus duct system a center feed-in connector comprising a duct section for insertion in a duct run, said duct section having a top wall, side walls depending from the edges of the top wall, and bottom flanges extending inwardly from the lower edges of the side walls leaving a slot between said flanges, tubular bus bars housed in said duct section, insulator plates of inverted U-shape fixed in the ends of said duct section, means for supporting the ends of said bus bars spaced around in the inner edges of said insulator plates so that said bus bars are accessible through said slot, said bus bars being discontinuous at a point near the lengthwise center of said duct section, an insulating partition occupying the discontinuity in said bus bars, a branch connection box mounted on the top wall of said duct section, an insulating block mounted in said box, circuit terminals mounted on said block and connected to different ones of said bus bars on different sides of said partition in said duct section and means for introducing conductors into said box for connection with said terminals, whereby conductors from different sources may be independently connected to the said bus bars on each side of said partition.

2. In a bus duct system a center feed-in connector comprising a duct section for insertion in a duct run, said duct section having a top wall, side walls depending from the edges of the top wall, and bottom flanges extending inwardly from the lower edges of the side walls leaving a slot between said flanges, bus bar sections housed in each end of said duct section, insulator plates fixed in the ends of said duct section, means for supporting the outer ends of bus bar sections in said insulator plates, insulator plates supporting the inner ends of the respective bus bar sections in said duct section, a branch connection box mounted on a wall of said duct section, two spaced apart insulating blocks mounted in said box, circuit terminals mounted on said blocks and connected to the respective bus bars in said duct section, an insulating barrier between the inner ends of said bus bars, and means for introducing conductors into said box for connection with said terminals.

3. In a bus duct system, a center feed-in and electrically sectionalizing unit comprising a duct member having a longitudinal slot in one face thereof and an opening in the opposite face thereof, a transverse insulating partition mounted within said duct member at a point opposite said opening, a plurality of bus bars insulatably mounted in parallel spaced relation within said duct member, a first half of said bus bars extending from one end of said duct member to said insulating partition, and the second half of said bus bars extending from the other end of said duct member to said insulating partition, a junction box having an opening in one side thereof secured to said duct member with its opening in registry with said duct member opening, an insulating block mounted within said box, a plurality of electrical terminals mounted on said block, and permanent connection means between different ones of said terminals and different ones of said bus bars.

RYNOLD A. SALOMONE.
CECIL B. TURTON.

REFERENCES CITED

The following references are of record in the file of this patent:

UNITED STATES PATENTS

| Number | Name | Date |
|---|---|---|
| 2,036,265 | Frank et al. | Apr. 7, 1936 |
| 2,149,994 | Frank et al. | Mar. 7, 1939 |
| 2,175,148 | Davison | Oct. 3, 1939 |
| 2,251,404 | Frank et al. | Aug. 5, 1941 |
| 2,269,779 | Morten | Jan. 13, 1942 |
| 2,322,799 | Frank | June 29, 1943 |
| 2,343,232 | Togesen | Feb. 29, 1944 |
| 2,358,346 | O'Brien | Sept. 19, 1944 |
| 2,396,060 | Spengler et al. | Mar. 5, 1946 |